US009063257B2

(12) United States Patent
Lavizzari et al.

(10) Patent No.: US 9,063,257 B2
(45) Date of Patent: Jun. 23, 2015

(54) LED ILLUMINATION LAMP

(71) Applicant: ARTEMIDE S.p.A., Milan (IT)

(72) Inventors: Damiano Lavizzari, Cesano Maderno (IT); Andrea Gallucci, Milan (IT)

(73) Assignee: ARTEMIDE S.p.A., Milan (IT)

( * ) Notice: Subject to any disclaimer, the term of this patent is extended or adjusted under 35 U.S.C. 154(b) by 0 days.

(21) Appl. No.: 13/961,364

(22) Filed: Aug. 7, 2013

(65) Prior Publication Data

US 2014/0043853 A1    Feb. 13, 2014

(30) Foreign Application Priority Data

Aug. 7, 2012   (IT) .......................... MI2012A 001399

(51) Int. Cl.
| | |
|---|---|
| *F21V 8/00* | (2006.01) |
| *F21S 8/00* | (2006.01) |
| *F21Y 101/02* | (2006.01) |
| *F21S 6/00* | (2006.01) |
| *F21S 8/04* | (2006.01) |
| *F21S 8/06* | (2006.01) |
| *F21Y 105/00* | (2006.01) |

(52) U.S. Cl.
CPC ............ *G02B 6/0031* (2013.01); *G02B 6/0021* (2013.01); *G02B 6/0073* (2013.01); *F21Y 2101/02* (2013.01); *F21S 6/002* (2013.01); *F21S 8/00* (2013.01); *F21S 8/033* (2013.01); *F21S 8/04* (2013.01); *F21S 8/06* (2013.01); *F21Y 2105/00* (2013.01); *G02B 6/0036* (2013.01); *G02B 6/0046* (2013.01)

(58) Field of Classification Search
CPC ........ G02B 6/0021; G02B 6/0031; F21S 8/00
USPC .................. 362/299, 307, 308, 309, 607, 609
See application file for complete search history.

(56) References Cited

U.S. PATENT DOCUMENTS

| | | | |
|---|---|---|---|
| 2011/0305026 A1* | 12/2011 | Mochizuki | .................... 362/308 |
| 2012/0013811 A1 | 1/2012 | Shimizu | |
| 2013/0194810 A1* | 8/2013 | Sun et al. | ...................... 362/308 |

FOREIGN PATENT DOCUMENTS

| | | | |
|---|---|---|---|
| EP | 1367318 A1 | 12/2003 | |
| EP | 2163701 A1 | 3/2010 | |

(Continued)

OTHER PUBLICATIONS

Italian International Search Report of MI20121399 dated Mar. 27, 2013.

(Continued)

*Primary Examiner* — David V Bruce
(74) *Attorney, Agent, or Firm* — Venable LLP; Robert Kinberg

(57) ABSTRACT

A LED illumination lamp extending substantially along and about an axis, and having: a LED light source located substantially along the axis; a light diverting optical element located substantially in front of the light source, along the axis, and designed to laterally divert the light impinging substantially axially on the optical element; and an optical guide plate surrounding the optical element and the axis, and having a seat housing the light source and the optical element; the plate extending along the axis, between two opposite faces respectively defining a front light-exit surface, and a rear active surface having a number of circumferential annular projections spaced radially apart and concentric with the axis.

21 Claims, 4 Drawing Sheets

(56) References Cited

FOREIGN PATENT DOCUMENTS

| | | |
|---|---|---|
| FR | 2841966 A1 | 1/2004 |
| WO | WO-99/09349 A1 | 2/1999 |

OTHER PUBLICATIONS

European Search Report in Application No. EP 13179648.4 mailed Jul. 11, 2013.

* cited by examiner

LED ILLUMINATION LAMP

The present invention relates to a LED illumination lamp (that is to say, a lighting fixture used as a room or interior or exterior space lighting device).

BACKGROUND OF THE INVENTION

Though used increasingly widely, LED lighting fixtures still have several drawbacks, mainly due to the intrinsic characteristics of the LED light source.

To begin with, a LED is a substantially spot, or at any rate very small, source; so, to obtain a large, possibly homogeneous, lighting surface, as required in some applications, a multiple-LED arrangement is needed, thus increasing the cost and complexity of the LED power and control circuits.

Moreover, LED sources used for lighting purposes may give rise to glare phenomena.

Also, adequately collimating the light beam emitted by the LEDs normally calls for the use of optical systems that are relatively complex and/or bulky—especially in length (along the optical axis of the system).

SUMMARY OF THE INVENTION

It is an object of the present invention to provide a LED illumination lamp designed to eliminate the drawbacks of the known art; more specifically, it is an object of the invention to provide a lamp which, despite using a small LED source, provides a large, homogeneous lighting surface, and is also extremely easy to produce.

The present invention therefore relates to a LED illumination lamp substantially as defined in the accompanying Claim 1 and, as regards its preferred characteristics, in the dependent Claims.

The lamp according to the invention employs a single light source with a small emission area, which is displaced evenly over a much larger lighting surface—larger to several degrees of magnitude. The result is a large, substantially homogeneous lighting surface, without recourse to an arrangement of small, high-cost, harder-to-control light sources.

Collimation of the light emitted by the lamp can be modulated by simply calibrating the inclination of the exit surface, i.e. using a plate thicker at the centre than at the radially outer peripheral edge.

The result is a lighting assembly with the desired degree of collimation, and which has a thickness (i.e. an axial (longitudinal) size) extremely small, and which, unlike known conventional solutions, extends mainly radially as opposed to longitudinally.

All the component parts of the lamp and the lamp as a whole are easy to produce and assemble and therefore also low-cost.

BRIEF DESCRIPTION OF THE DRAWINGS

A number of non-limiting embodiments of the invention will be described by way of example with reference to the attached drawings, in which.

DETAILED DESCRIPTION OF THE INVENTION

Figure 1:
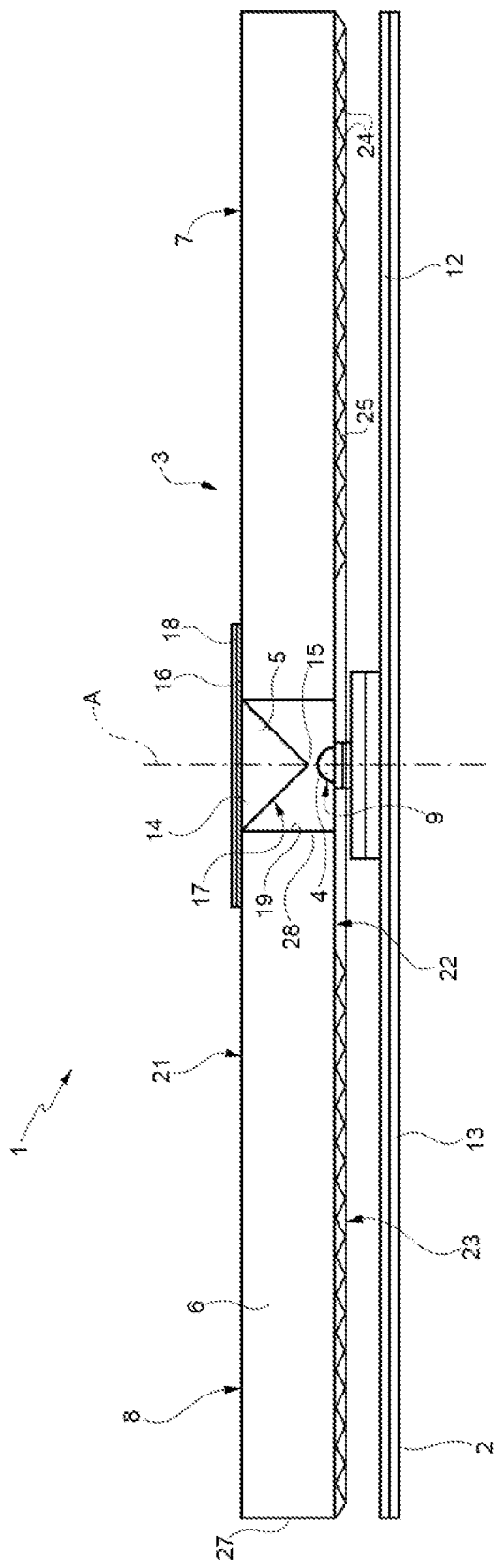
FIG. 1 shows a schematic section of a LED illumination lamp in accordance with the invention, and of which only the main component parts are shown.
Figure 2:
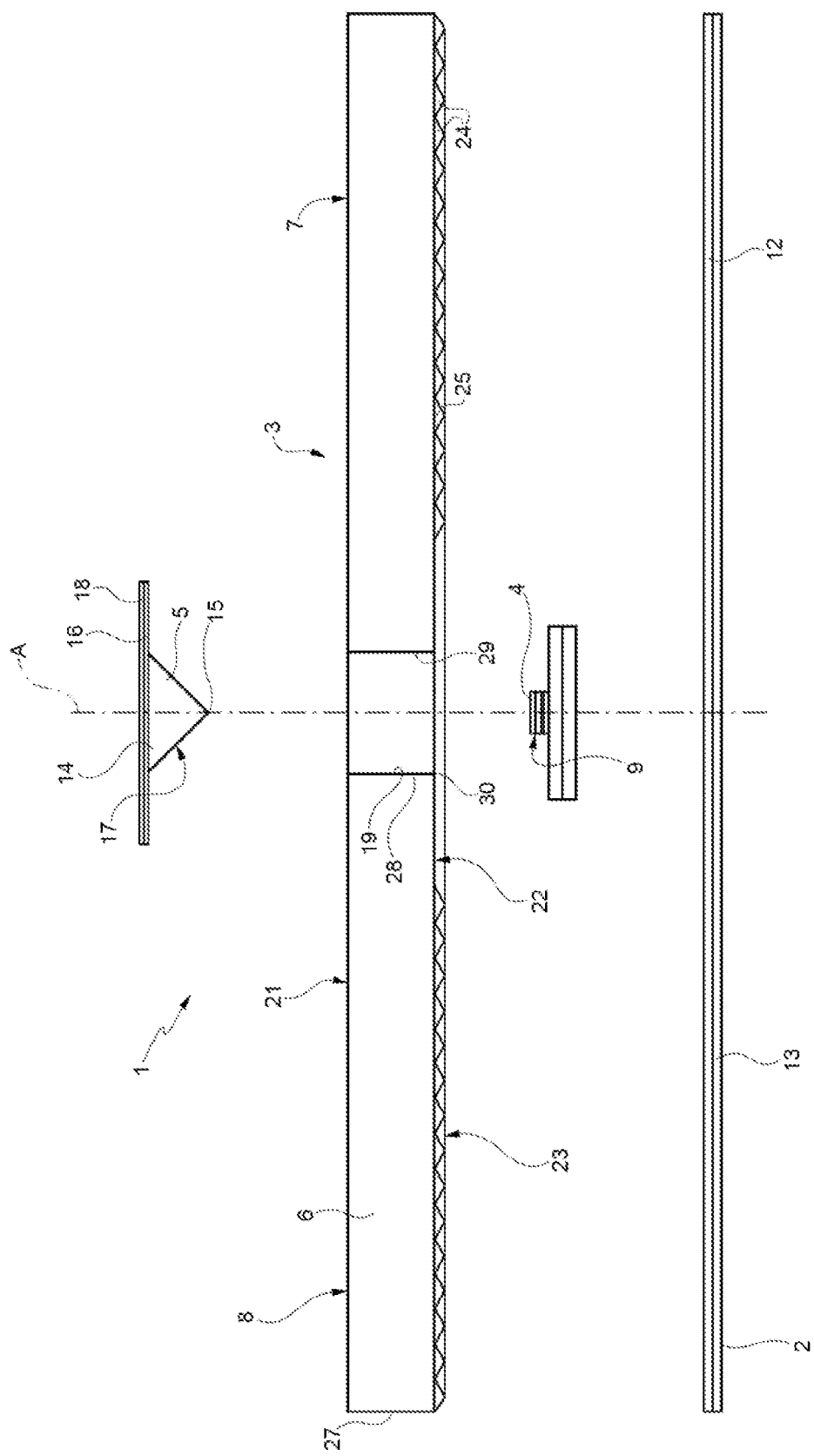
FIG. 2 shows an exploded section of the FIG. 1 lamp with a different type of LED light source.

With reference to FIGS. 1 and 2, a LED illumination lamp 1 extends substantially along and about an axis A, and comprises a supporting structure 2 (only shown schematically), and a lighting assembly 3 supported by structure 2.

Structure 2 may be variously designed, also according to the type of lamp 1 (suspended, recessed, table lamp, etc.), and comprises, for example, known fastening members (not shown) for fixing the lamp to a ceiling or wall.

Lighting assembly 3 comprises: a LED light source 4 comprising one or more LEDs and located substantially along axis A; a light-diverting optical element 5 located substantially in front of light source 4 along axis A; and an optical guide plate 6 surrounding optical element 5 and axis A, and having a front light-emitting surface 7 defining a main front lighting surface 8 of lamp 1.

Light source 4 may (though not necessarily) be a COB (chip-on-board) LED source. Light source 4 may comprise a single LED, a multichip LED, or a LED array, and has an emission (light-emitting) surface 9, which is preferably substantially circular about axis A and may curve along axis A (by way of example, FIG. 1 shows a light source 4 with a curved LED, and FIG. 2 a light source 4 with a flat LED).

Emission surface 9 is generally small, i.e. is much smaller in area than front surface 7, i.e. than lighting surface 8 (the area of which, in the example shown, is substantially defined by the cross section area of lamp 1, and more specifically by the size of plate 6).

Surface 7 (i.e. lighting surface 8) is substantially perpendicular to or tilted slightly with respect to axis A, but nevertheless faces the same way as emission surface 9.

For the sake of simplicity, the electric and/or electronic power and control components of light source 4 are now shown.

Light source 4 is mounted on a heatsink 12 which is located beneath or behind light source 4, and may even form part of supporting structure 2, so as not only to dissipate heat, but also provide structural support for lighting assembly 3.

In the example shown, heatsink 12 comprises a disk-shaped metal body 13 facing plate 6. It is understood, however, that heatsink 12 and/or body 13 may be designed differently.

Optical element 5 extends substantially along axis A, and is shaped so as to laterally (in the example shown, radially) divert the light impinging substantially axially on it. More specifically, optical element 5 is shaped so as to divert most or all of the light emitted by light source 4 into plate 6.

In the example shown, optical element 5 comprises a reflecting element 14 in the form of a conical mirror, which has a vertex 15 facing light source 4, and a base 16 opposite vertex 15 and substantially parallel to front surface 7. Reflecting element 14 has a centrally symmetrical lateral reflecting surface 17—in the example shown, a conical surface. Preferably, surface 17 is a reflecting but non-diffusing or poorly diffusing surface, e.g. an aluminized surface. Optionally, surface 17 is faceted (i.e. made of a number of faces side by side around axis A).

Optical element 5 may, however, be of a different type, e.g. a lens or system of lenses, provided it is capable of laterally/radially diverting the light impinging axially on it.

Optionally, though not necessarily, assembly 3 comprises an opaque shield 18 on top of optical element 5, and more specifically on base 16. Shield 18 covers, and possibly extends radially about, base 16.

Optical element 5 is housed in a seat 19 in plate 6.

Plate 6 is made of transparent material, e.g. glass or polymer material (e.g. PMMA). In the non-limiting example shown, plate 6 is in the form of a circular disk (but may be formed differently).

Plate 6 extends, along axis A, between two opposite faces 21, 22 substantially perpendicular to axis A and respectively defining front light-exit surface 7, and a rear active surface 23 facing heatsink 12.

Face 21 (defining front surface 7 of lamp 1) may be perpendicular to axis A or inclined and/or curved or partly curved with respect to axis A; face 22 (defining rear active surface 23) is substantially perpendicular to axis A (i.e. defines or lies in a plane perpendicular to axis A); in particular, face 22 comprises one or more flat portions defining a plane perpendicular to axis A. Front surface 7 (face 21) is substantially smooth.

Rear active surface 23 (face 22), on the other hand, has a number of continuous circumferential annular projections 24 spaced apart radially, and which project from face 22 and are concentric with axis A.

Figure 3:
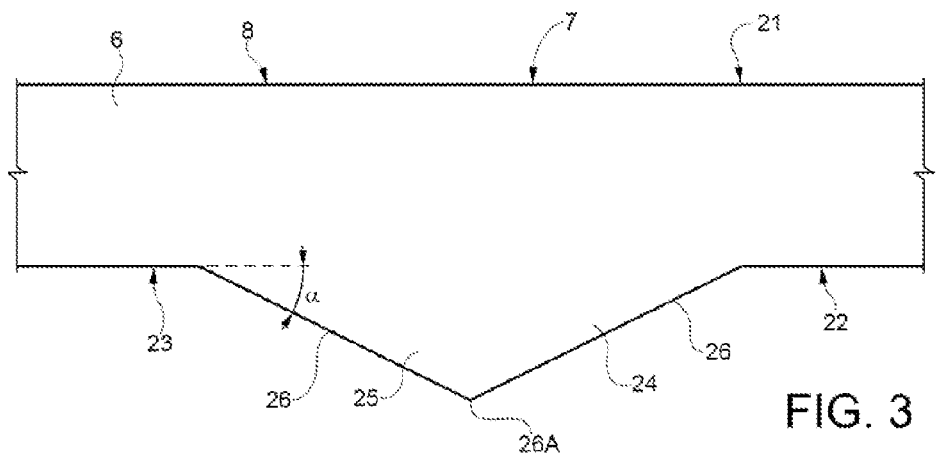
FIG. 3 shows a larger-scale detail of the FIG. 1 lamp.

With reference also to FIG. 3, projections 24 are defined by respective concentric annular prisms 25, which circle axis A, and preferably have a triangular, e.g. substantially isosceles-triangle-shaped, cross section.

Projections 24 (i.e. prisms 25) project from face substantially axially, i.e. parallel to axis A; each projection 24 has two opposite lateral sides 26 sloping with respect to face 22 and axis A, and converging at a vertex 26A; and vertices 26A project from face 22 (i.e. from the plane defined by face 22) and lie in a common plane parallel to face 22 (and to the plane defined by face 22) and perpendicular to axis A.

The sides of prisms 25 (defining sides 26 of projections 24) slope with respect to face 22. More specifically, the sides of prisms 25 slope with respect to face 22 by an angle $\alpha$ (i.e. a base angle defined as the angle between one side and the base of the prism on face 22) ranging between roughly 20° and 30° and preferably of about 25° (with a tolerance of about ±2°).

Projections 24 may be variously spaced on face 22, i.e. may be spaced different distances apart, and may be separated from one another by flat annular surface portions.

Plate 6 has a radially outer peripheral edge 27 substantially parallel to axis A and joining faces 21 and 22.

Edge 27 is preferably an internally reflecting edge, e.g. aluminized or treated in any other known manner, so as to reflect into plate 6 the light impinging on edge 27 from inside plate 6.

Plate 6 has central seat 19 located along axis A and aligned with light source 4.

Seat 19 houses light source 4 and optical element 5. Advantageously, light source 4 and optical element 5—more specifically, reflecting surface 17—are housed entirely in (i.e. do not project axially outwards of) seat 19.

Light source 4 is thus located substantially in the centre of plate 6, along axis A which also defines a central axis of symmetry of plate 6.

Seat 19 is bounded by a lateral, e.g. substantially cylindrical, lateral wall 28 surrounding axis A, optical element 5 and light source 4.

Seat 19 has an inlet opening 29 (FIG. 2) formed in face 22 and bounded by an annular peripheral edge 30; light source 4 is located inside seat 19 and projects axially (along axis A) beyond edge 30 into seat 19; projections 24 project (in the opposite direction to light source 4) from face 22 and beyond edge 30 bounding seat 19 housing light source 4 and optical element 5.

In actual use, the light emitted by light source 4 is sent by emission surface 9 into seat 19, and is diverted radially by optical element 5 into plate 6, through lateral wall 28 bounding seat 19.

Optical element 5, and more specifically its reflecting surface 17, are shaped so as to reflect the light from light source 4 onto lateral wall 28 of seat 19 and, through lateral wall 28, into plate 6.

The light undergoes multiple internal reflections inside plate 6, and in particular inside projections 24, which are shaped so as to internally reflect substantially all the incident light and so prevent it from exiting plate 6 through face 22. The light is therefore reflected onto face 21, and exits from front surface 7.

The light is reflected at less than the total reflection angle, so that it is emitted substantially entirely through front surface 7.

The result is a highly homogeneous, evenly illuminated lighting surface 8, much larger in area than emission surface 9 of light source 4.

The highly uniform illumination of front surface (lighting surface 8) is due to the combined effect of the shape (in particular the angle) of concentric projections 24; the quadratic increase with the radius of the surface as propagation proceeds; and the statistical probability of the rays exiting increasing with the total number of internal reflections.

Figure 4:
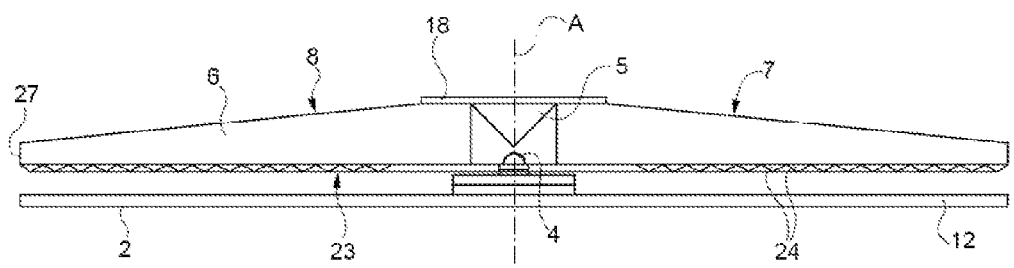
FIGS. 4 and 5 show schematic sections of respective variations of the lamp according to the invention.
Figure 5:
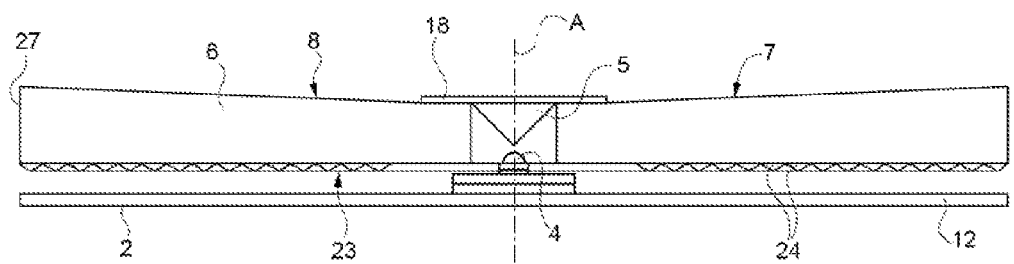

As shown schematically in FIGS. 4 and 5, the directionality (collimation) of the light exiting surface 7, i.e. lamp 1, can also be controlled according to the location and/or type of lamp 1, by modifying the angle of face 21 (defining surface 7) with respect to axis A and to opposite face 22. In other words, collimation of the light beam exiting lamp 1 through surface 7 is modified by appropriately flaring plate 6, i.e. using a plate 6 of radially varying thickness.

Reducing the thickness of plate 6 radially towards peripheral edge 27, i.e. so that surface 7 slopes downwards towards edge 27 (FIG. 4), increases convergence of the light beam from surface 7.

Conversely, increasing the thickness of plate 6 radially towards peripheral edge 27, i.e. so that surface 7 slopes downwards towards axis A, increases divergence of the light beam from surface 7.

To alter the geometry of the beam from lamp 1 (in particular, to modify collimation of the beam), surface 7 may optionally have or be associated with a microprism structure, e.g. may be coupled to a transparent sheet (of polymer material) with microprisms, facing surface 7 and possibly separated from it by a small gap.

In one embodiment, active surface 23 is a reflecting surface, e.g. provided with a reflecting layer acting inwards of plate 6 (towards surface 7). In fact, though plate 6 as a whole, and active surface 23 in particular, mainly operate by internal reflection, the efficiency of lamp 1 has been found to improve with a reflecting active surface 23, probably due to light polarization phenomena.

Figure 6:
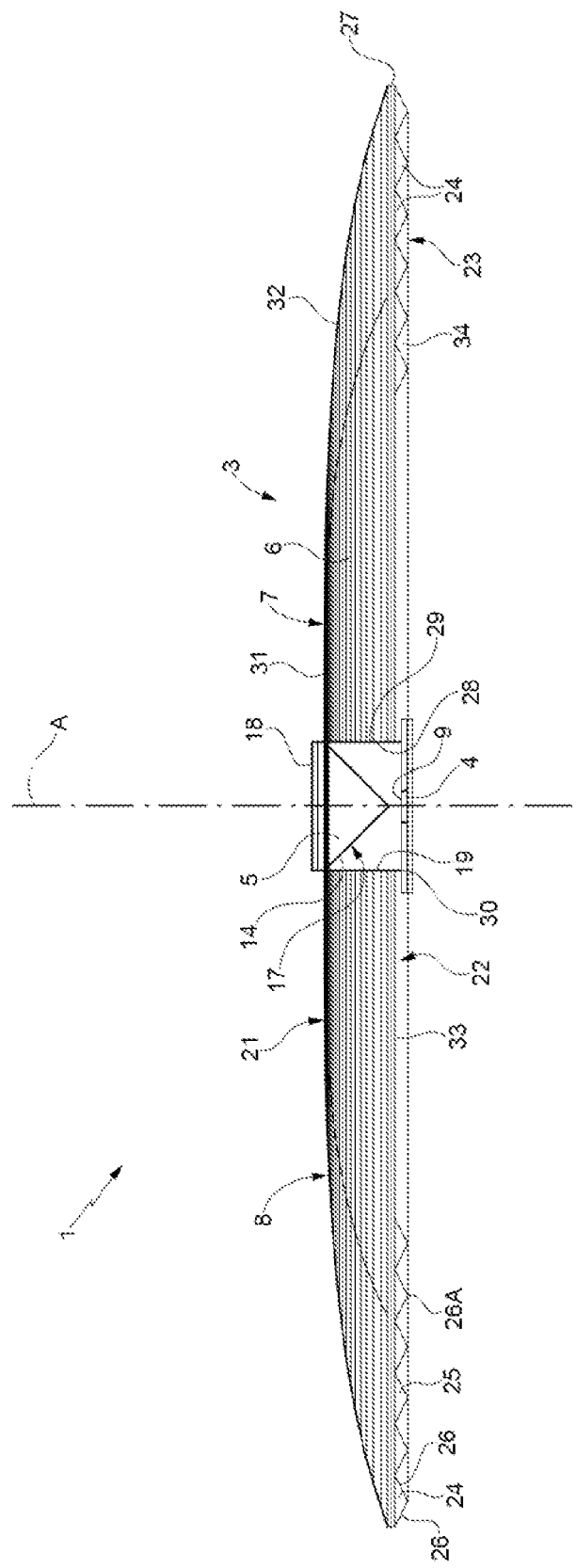
FIG. 6 shows a schematic section, with parts removed for clarity, of a further variation of the lamp according to the invention.

In the FIG. 6 embodiment, in which details similar or identical to those already described are indicated using the same reference numbers, optical guide plate 6 again extends along axis A between two opposite faces 21, 22 substantially perpendicular to axis A and respectively defining a front light-exit surface 7 (main front lighting surface 8 of lamp 1), and a rear active surface 23 facing heatsink 12 (not shown in FIG. 6).

Face 21 defining front surface 7 is curved or partly curved—more specifically, convex—with respect to axis A. More specifically, front surface 7 is or comprises a non-spherical surface. In the FIG. 6 embodiment, face 21 comprises a substantially flat central portion 31 surrounding and perpendicular to axis A; and a curved—more specifically, non-spherical—portion 32 radially outwards of central portion 31; plate 6 tapers towards edge 27.

Face 21 is substantially smooth, i.e. has no projections (though face 21, or portions of it, may optionally be provided with microprisms, as described previously).

As in the other embodiments, face 22 (defining rear active surface 23) is perpendicular to axis A, and has a number of continuous circumferential annular projections 24 spaced radially apart and concentric with axis A. In this embodiment, too, projections 24 project substantially axially, i.e. parallel to axis A, from face 22; and each projection 24 has two opposite lateral sides 26 sloping with respect to face 22 and axis A, and converging at a vertex 26A.

Face 22 preferably comprises at least one radially inner annular portion 33 surrounding axis A and seat 19, and which is flat and smooth with no projections. Projections 24 are located on a radially outer peripheral portion 34 radially outwards of portion 33 towards edge 27. Peripheral portion 34 of face 22 with projections 24 is substantially aligned axially with non-spherical portion 32 of opposite face 21.

Projections 24 are again defined by respective concentric annular prisms 25 circling axis A, as described above with reference to FIG. 3.

Projections 24, and more specifically, sides 26, advantageously have internally reflecting surfaces, being for example aluminized.

As compared with the embodiments described previously, this variation provides for reducing the emission angle, to generate a narrower light beam and, more specifically, to obtain a collimated light beam.

Clearly, further changes may be made to the LED illumination lamp as described and illustrated herein without, however, departing from the scope of the accompanying Claims.

The invention claimed is:

1. A LED illumination lamp, extending substantially along and about an axis and comprising a LED light source located substantially along the axis; a light diverting optical element located substantially in front of the light source along the axis and shaped so as to laterally divert the light impinging substantially axially on the optical element; and an optical guide plate surrounding the optical element and the axis; the plate extending along the axis between two opposite faces respectively defining a front light-exit surface and a rear active surface having a series of annular projections spaced radially apart from one another and concentric with the axis; the lamp being characterized in that the plate is provided with a seat, that houses the light source and the optical element and is bounded by a lateral wall surrounding the axis, the optical element, and the light source; and in that the optical element has a reflecting surface shaped so as to reflect the light from the light source onto the lateral wall of the seat and, through the lateral wall, into the plate; the face defining the rear active surface being substantially perpendicular to the axis; and the projections projecting from the face substantially parallel to the axis, and beyond an edge bounding the seat in which the light source and the optical element are housed; and wherein each projection has two opposite lateral sides sloping with respect to the axis and the face.

2. The lamp as claimed in claim 1, wherein the plate and the projections are shaped so as to internally reflect onto the front surface substantially all the light entering the plate through the lateral wall of the seat, and to prevent the light from exiting the plate through the rear active surface.

3. The lamp as claimed in claim 1, wherein the projections are defined by respective concentric annular prisms circling the axis.

4. The lamp as claimed in claim 3, wherein the prisms have a substantially triangular cross section.

5. The lamp as claimed in claim 3, wherein the prisms have sides which slope, with respect to the face of the plate from which they project, by an angle ranging between roughly 20° and 30°.

6. The lamp as claimed in claim 1, wherein the plate has a radially outer peripheral edge substantially parallel to the axis, and which joins the faces of the plate and is an internally reflecting edge so as to reflect into the plate the light impinging on the edge from inside the plate.

7. The lamp as claimed in claim 1, wherein the optical element comprises a reflecting element in the form of a conical mirror with a vertex facing the light source.

8. The lamp as claimed in claim 1, wherein the plate is in the form of a circular disk.

9. The lamp as claimed in claim 1, wherein the plate is flared, varying radially in thickness.

10. The lamp as claimed in claim 1, wherein the front surface has or is associated with a microprism structure.

11. The lamp as claimed in claim 1, wherein the front surface faces a transparent sheet of polymer material with a microprism structure.

12. The lamp according to claim 11, wherein the transparent sheet of polymer material with the microprism structure is separated from the front surface by a gap.

13. The lamp as claimed in claim 1, wherein the rear active surface is a reflecting surface having a reflecting layer acting inwards of the plate and onto the front surface.

14. The lamp as claimed in claim 1, wherein the face defining the front surface is at least partly curved with respect to the axis.

15. The lamp as claimed in claim 1, wherein the face defining the front surface is or comprises a non-spherical surface.

16. The lamp as claimed in claim 1, wherein the plate has a radially outer peripheral edge; and the face defining the rear active surface comprises: a radially inner annular portion surrounding the axis and the seat, and which is flat and smooth with no projections; and a radially outer peripheral portion located radially outwards of the radially annular inner portion, towards the peripheral edge, and having projections.

17. The lamp as claimed in claim 1, wherein the projections have internally reflecting surfaces.

18. The lamp as claimed in claim 17, wherein the projections have aluminized surfaces.

19. The lamp as claimed in claim 7, wherein the radially outer peripheral edge is an aluminized edge.

20. A LED illumination lamp, extending substantially along and about an axis and comprising a LED light source located substantially along the axis; a light diverting optical element located substantially in front of the light source along the axis and shaped so as to laterally divert the light impinging substantially axially on the optical element; and an optical guide plate surrounding the optical element and the axis; the plate extending along the axis between two opposite faces respectively defining a front light-exit surface and a rear active surface having a series of annular projections spaced radially apart from one another and concentric with the axis; the lamp being characterized in that the plate includes a seat, that houses the light source and the optical element and is bounded by a lateral wall surrounding the axis, the optical element, and the light source; and in that the optical element has a reflecting surface shaped so as to reflect the light from the light source onto the lateral wall of the seat and, through the lateral wall, into the plate; the face defining the rear active surface being substantially perpendicular to the axis; and the projections projecting from the face substantially parallel to the axis, and beyond an edge bounding the seat in which the light source and the optical element are housed; and wherein the optical element comprises a reflecting element in the form of a conical mirror with a vertex facing the light source.

21. A LED illumination lamp, extending substantially along and about an axis and comprising a LED light source located substantially along the axis; a light diverting optical element located substantially in front of the light source along the axis and shaped so as to laterally divert the light impinging substantially axially on the optical element; and an optical guide plate surrounding the optical element and the axis; the plate extending along the axis between two opposite faces respectively defining a front light-exit surface and a rear active surface having a series of annular projections spaced radially apart from one another and concentric with the axis; the lamp being characterized in that the plate includes a seat, that houses the light source and the optical element and is bounded by a lateral wall surrounding the axis, the optical element, and the light source; and in that the optical element has a reflecting surface shaped so as to reflect the light from the light source onto the lateral wall of the seat and, through the lateral wall, into the plate; the face defining the rear active surface being substantially perpendicular to the axis; and the projections projecting from the face substantially parallel to the axis, and beyond an edge bounding the seat in which the light source and the optical element are housed; and wherein the plate is in the form of a circular disk.

\* \* \* \* \*